United States Patent [19]
Johansson

[11] Patent Number: 5,200,143
[45] Date of Patent: Apr. 6, 1993

[54] FUEL ASSEMBLY FOR NUCLEAR REACTOR

[75] Inventor: Lennart Johansson, Västerås, Sweden

[73] Assignee: ABB Atom AB, Västerås, Sweden

[21] Appl. No.: 864,329

[22] Filed: Apr. 6, 1992

[30] Foreign Application Priority Data

Apr. 11, 1991 [SE] Sweden .................................. 9101084

[51] Int. Cl.5 .............................................. G21C 3/32
[52] U.S. Cl. ..................................... 376/449; 376/446
[58] Field of Search ................ 376/449, 446, 440, 438

[56] References Cited

U.S. PATENT DOCUMENTS 4,364,901 12/1982 Feutrel .................................. 376/438
5,009,837 4/1991 Nguyen et al. ....................... 376/446

Primary Examiner—Daniel D. Wasil
Attorney, Agent, or Firm—Watson, Cole, Grindle & Watson

[57] ABSTRACT

The invention relates to a fuel assembly (1) for a nuclear reactor and comprises a number of parallel fuel rods (2) which are held together by means of spacers (4,5) arranged along the fuel rods as well as guide tubes (3) arranged between the fuel rods (2) and parallel thereto. The guide tubes extend through the spacers (4) and are fixed between a top nozzle (6) and a bottom nozzle (7). According to the invention, bottom sleeves (8) for the guide tubes (3) are arranged in the bottom spacer (5). These bottom sleeves (8) are rigidly fixed to the bottom spacer (5) and rest against the bottom nozzle (7). Each bottom sleeve (8) is provided with a first locking member (9) for receiving a second locking member (10), arranged at the end of the respective guide tube (3), in order to rigidly lock the guide tube (3) to the bottom sleeve (8).

2 Claims, 2 Drawing Sheets

FUEL ASSEMBLY FOR NUCLEAR REACTOR

TECHNICAL FIELD

The present invention relates to a fuel assembly for a nuclear reactor, preferably of PWR type.

BACKGROUND ART

A fuel assembly of a known design comprises a plurality of parallel fuel rods and control rod guide tubes, wherein fuel rods and guide tubes are retained into an elongated bundle in predetermined mutual positions by means of a number of spacer grids, referred to below simply as spacers, arranged across the bundle. Top and bottom nozzles are arranged at the ends of the fuel assembly and attached to the control rod guide tubes, which extend somewhat above and below the ends of the fuel rods. In known fuel assemblies each control rod guide tube has been fixed to the bottom nozzle by means of a screw extending through the bottom nozzle and threaded into a corresponding thread in an end plug fixed to the control rod guide tube. This, in turn, has tended to give rise to an axial rotation of the control rod guide tube. Such a rotation may cause a built-in torsional stress in the guide tube, which in turn may lead to the fuel bundle, after irradiation, becoming spirally twisted. This may eventually lead to handling problems when transferring fuel in the core, which, of course, entails a serious drawback.

SUMMARY OF THE INVENTION

According to the present invention, the above drawback is avoided by arranging, in the spacer nearest the bottom nozzle, bottom sleeves for the control rod guide tubes, these bottom sleeves being rigidly fixed to this spacer (i.e. rigid in the direction of rotation). The bottom sleeves rest against the bottom nozzle and are provided with a first locking member for receiving a second locking member arranged at the end of a control rod guide tube. In this way, the guide tube is locked in a rigid manner in relation to the bottom sleeve. Because the bottom sleeve, in its turn, is rigidly fixed in the bottom spacer, the guide tube is prevented from rotating when, as described above, it is screwed to the bottom nozzle.

BRIEF DESCRIPTION OF THE DRAWINGS

The invention will be most readily understood with reference to the accompanying drawings, wherein.

DESCRIPTION OF THE PREFERRED EMBODIMENT

Figure 1:
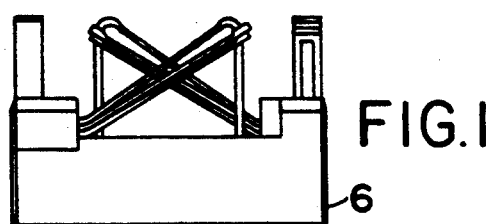
FIG. 1 shows a fuel assembly without fuel rods for a PWR type reactor.

FIG. 1 shows a fuel assembly 1 of PWR type. It is composed of fuel rods 2 (not shown in FIG. 1; see FIG. 4) and guide tubes 3 for control rods. Fuel rods 2 and guide tubes 3 are retained into an elongated bundle of a number of spacers 4 arranged across the bundle. The spacer 4 positioned at the bottom is named bottom spacer 5. The bundle is connected to a top nozzle 6 and a bottom nozzle 7 by means of the guide tubes 3. In the bottom spacer 5, bottom sleeves 8 for the guide tubes 3 are rigidly fixed. The bottom sleeves 8 rest against the bottom nozzle 7 and are provided with first locking members in the form of slots 9 for receiving second locking members, arranged at the end of a guide tube 3, in the form of tongues 10 (FIG. 2) whereby the guide tubes 3 are rigidly fixed.

Figure 2:
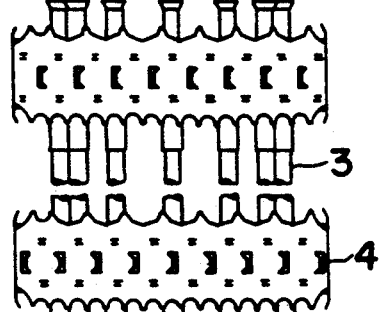
FIG. 2 shows an enlarged section A—A of, inter alia, a bottom sleeve fixed in the bottom spacer.
Figure 3:
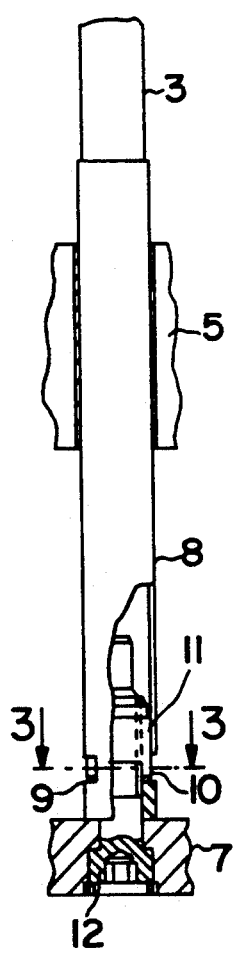
FIG. 3 shows a section B—B of FIG. 2.
Figure 3:
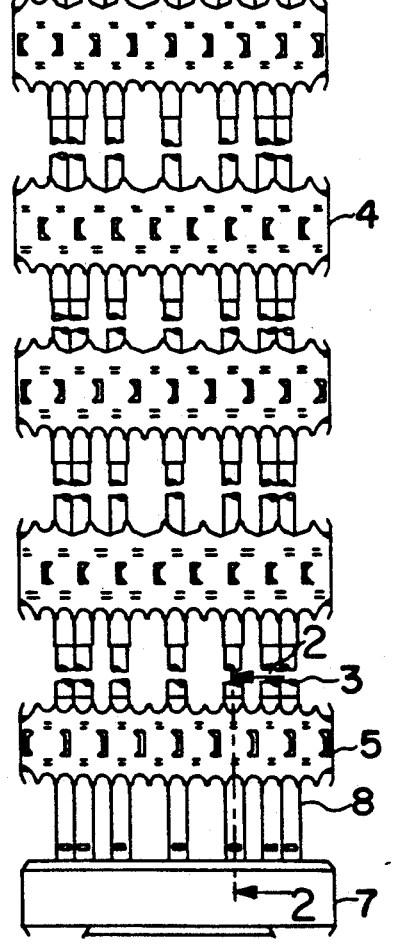
Figure 3:

FIG. 2 shows in enlarged form how the bottom sleeve 8 is fixed in the bottom spacer 5. The bottom sleeve 8 has such a diameter that a guide tube 3 with an associated end plug 11 may be inserted into the bottom sleeve 8. The end plug 11 which is rigidly fixed to the guide tube 3 is provided with tongues 10 which fit into slots 9 provided in the bottom sleeve 8. Through the bottom nozzle 7, a guide tube screw 12 is screwed into the end plug 11 whereby the guide tube 3 is fixed to the bottom nozzle 7 without any torsional stresses being initiated in the guide tube 3. FIG. 3 shows how the tongues 10 fit into the slots 9.

Figure 4:
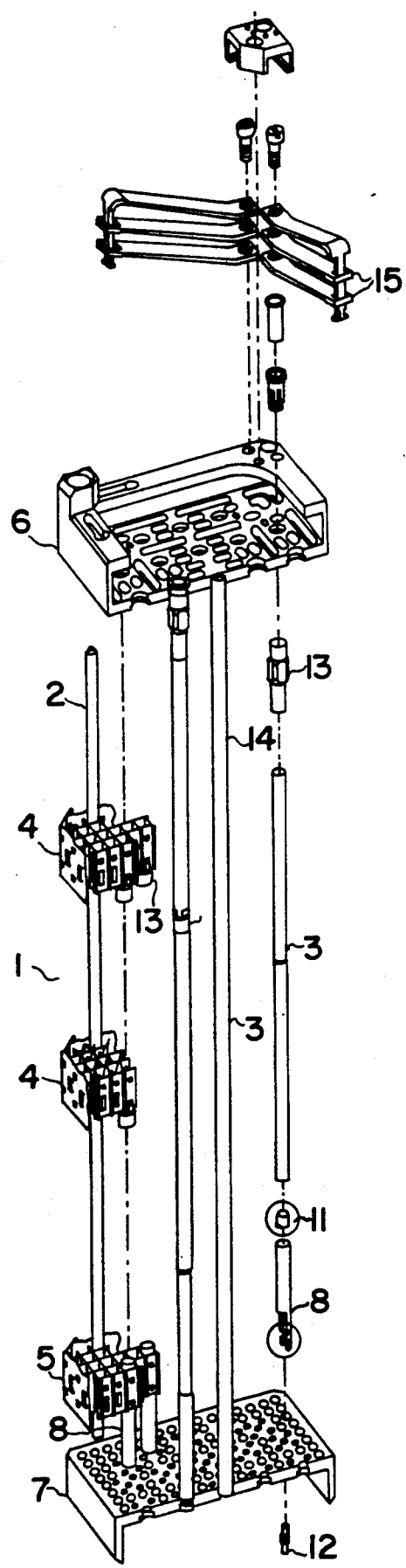
FIG. 4 is an exploded view of a fuel assembly with only a few fuel rods and guide tubes inserted.
Figure 5:
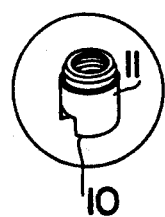
FIG. 5 is an enlarged view of an end plug provided with tongues according to the invention.
Figure 6:
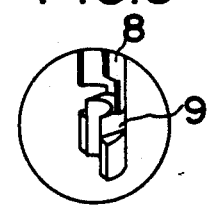
FIG. 6 is an enlarged view of the lower part of the bottom sleeve rigidly fixed in the bottom spacer.

In FIG. 4, 2 designates a fuel rod and 3 guide tubes. The spacer 4 comprises a grid by means of which fuel rods 2 and guide tubes 3 are mutually fixed so as to form a bundle. 13 designates sleeves for the guide tubes 3 and 14 an instrumentation tube. The bundle is fixed between a top nozzle 6 and a bottom nozzle 7. The top nozzle 6 is provided at the top with a spring package 15 intended to keep the fuel assembly 1 in position in the reactor core. Bottom sleeves 8 are welded in the bottom spacer 5. The bottom sleeves 8 rest against the bottom nozzle 7. A guide tube screw for fixing a guide tube 3 to the bottom nozzle 7 is designated 12. FIG. 5 shows in enlarged form an end plug 11 intended to be screwed or welded to a guide tube 3. The end plug 11 is provided with tongues 10 intended to engage into slots 9 which are shown enlarged in FIG. 6.

When a guide tube 3, with an end plug 11 fixed thereto, is inserted into the bottom sleeve 8, the tongues 10 of the end plug 11 slide into the slots 9 of the bottom sleeve 8, the guide tube 3 thus becoming rigidly fixed to the bottom sleeve 8. As mentioned before, the bottom sleeve 8 in its turn is rigidly fixed to the bottom space 5.

The slots 9 and the tongues 10, respectively, in the bottom sleeve 8 and the guide tube 3 may, of course, be arranged in different ways—the main thing is that the guide tube is locked in a simple manner to the rigidly arranged bottom sleeve 8. The locking should be of such a nature that the guide tube 3 can be detached, without difficulty, when the guide tube screw 12 is removed.

I claim:

1. A fuel assembly (1) for a nuclear reactor, comprising a number of parallel fuel rods (2) which are held together by means of spacers (4, 5) arranged along the fuel rods (2) as well as guide tubes (3) arranged between the fuel rods (2) in parallel therewith, said guide tubes (3) extending through the spacers (4, 5), a top nozzle (6) and a bottom nozzle (7) between which the guide tubes (3) are fixed, characterized in that bottom sleeves (8) for the guide tubes (3) are arranged in the spacer 5) nearest the bottom nozzle (7), said bottom sleeves (8) being rigidly fixed to the spacer (5) and resting against the bottom nozzle (7) and being provided with a first locking member for receiving a second locking member, arranged at the end of a guide tube, in order to lock the guide tube (3) so as to be rigid in the direction of rotation.

2. A fuel assembly according to claim 1, characterized in that the first locking member consists of at least one slot (9) for receiving the second locking member which consists of at least one tongue (10).

* * * * *